Jan. 8, 1952   P. W. DIETMANN   2,581,786
MACHINE FOR CUTTING MATCH SPLINTS OR THE LIKE
Filed April 2, 1946   2 SHEETS—SHEET 1
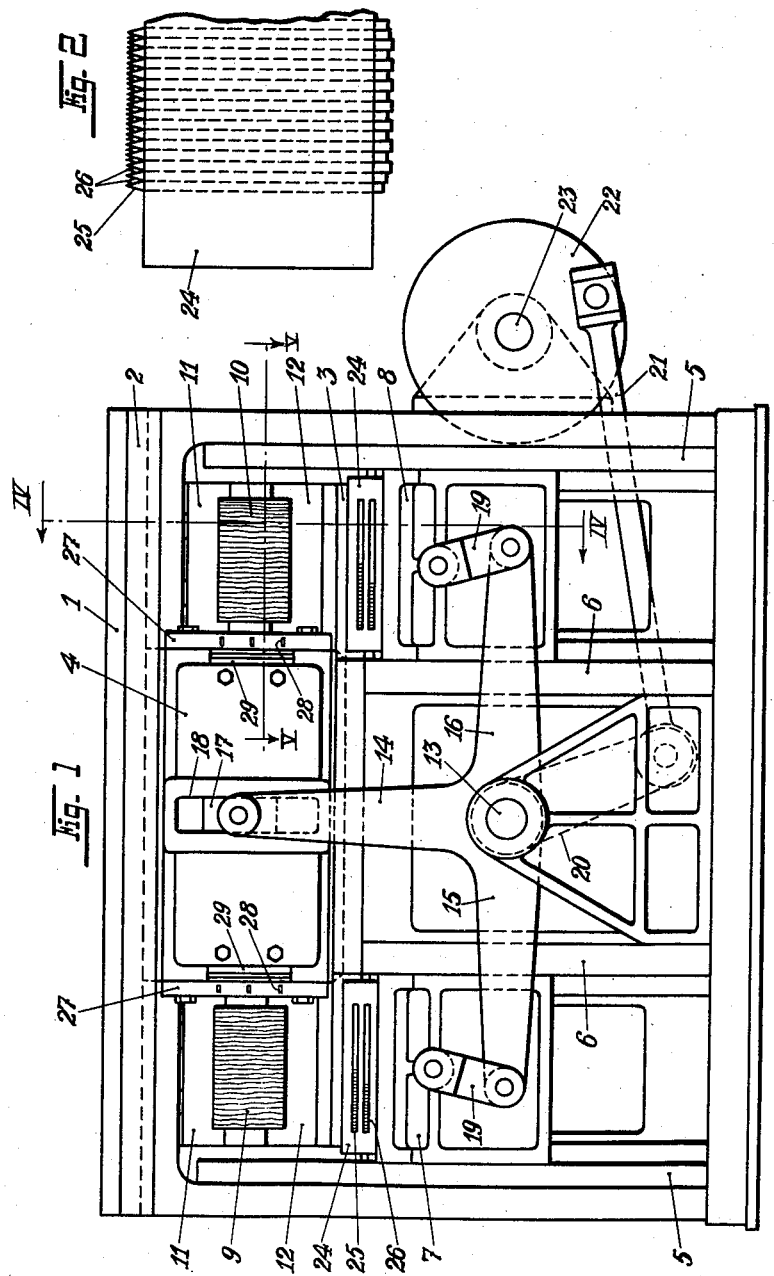
Inventor
Paul W. Dietmann
by Sommers & Young
Attorneys Jan. 8, 1952  P. W. DIETMANN  2,581,786
MACHINE FOR CUTTING MATCH SPLINTS OR THE LIKE
Filed April 2, 1946  2 SHEETS—SHEET 2
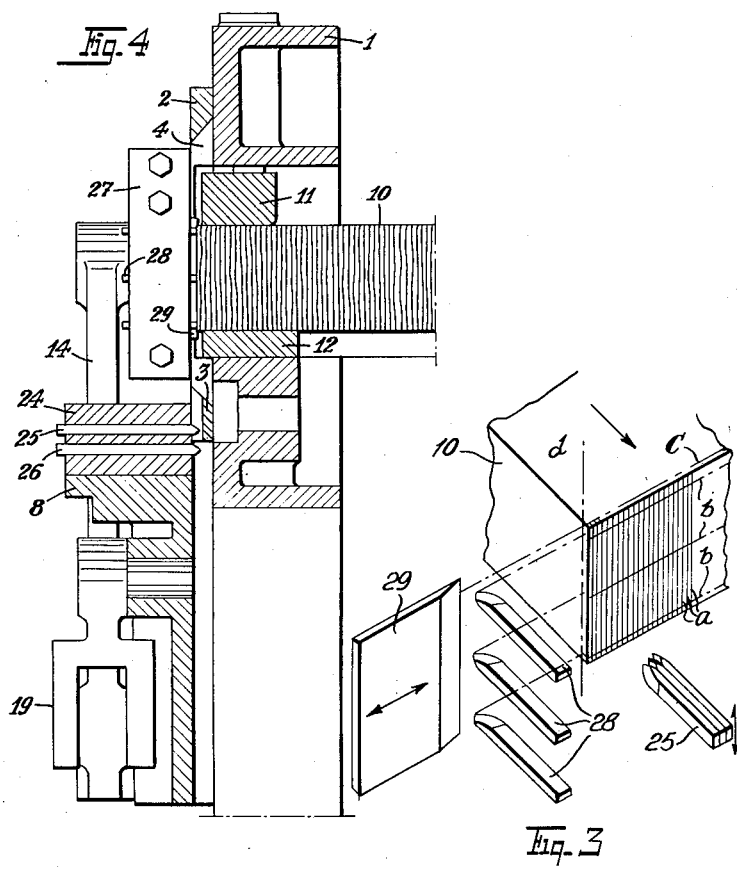
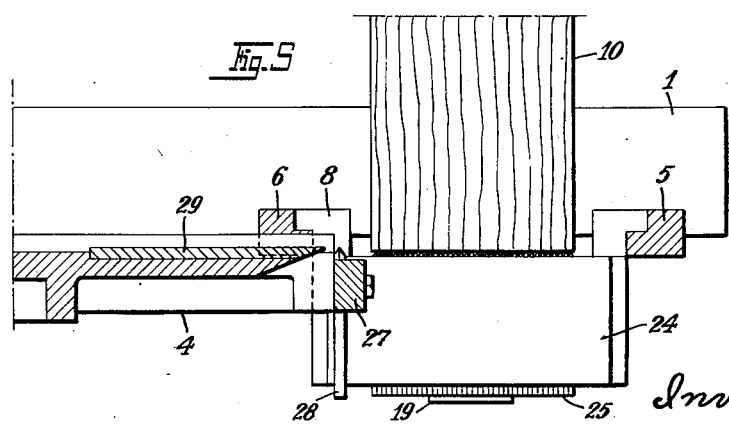
Inventor
Paul Wilhelm Dietmann
by Sommers + Young
Attorneys Patented Jan. 8, 1952

2,581,786

UNITED STATES PATENT OFFICE 2,581,786

MACHINE FOR CUTTING MATCH SPLINTS OR THE LIKE

Paul Wilhelm Dietmann, Jonkoping, Sweden, assignor to Aktiebolaget Siefvert & Fornander, Kalmar, Sweden, a Swedish joint-stock company Application April 2, 1946, Serial No. 659,059
In Sweden November 30, 1944

6 Claims. (Cl. 144—50)

This invention relates to a machine for cutting match splints or the like from a non-rotating wooden block, and more particularly to the type of machines, wherein the block is being scored lengthwise and crosswise of the grain by means of length- and cross-cutting knives respectively, and wherein the splints partially formed thereby are detached from the block by means of a severing-knife. Although this mode of splint cutting is very advantageous in point of principle, machines of this kind hitherto known have come to no use worth mentioning, since they have worked unsatisfactorily and with too low an output. In the same, scoring lengthwise has taken place after cross-scoring, and the length-cutters, the cross-cutters and the severing-knife have each been mounted on one of three separate carrying members. According to the present invention the sequence of the scoring operations is reversed, and the cross-cutters and the severing-knife are mounted on a common carrying member. This makes it possible considerably to simplify the construction of the machine, and this to the benefit of the capacity of the same. Especially in case the said carrying member is adapted to slide perpendicularly to the path of travel of another slide carrying the length cutters, the machine can easily be made double-acting too, one of the slides being provided with double sets of oppositely directed cutting-tools and adapted in co-operation with the second slide and a third slide movable parallel to the second one, alternately to work at two working-pieces. In machines designed according to the invention the length-cutting knives should, preferably, be arranged in a plurality of succeeding rows with a correspondingly increased distance between the knife-edges within each row.

A double-acting machine according to the invention is shown by way of example in the annexed drawing, wherein Fig. 1 is a front view of the machine, and Fig. 2 is a partial plan view, on a larger scale, of a holder with length-cutting knives. Fig. 3 is a diagrammatic perspective view illustrating the action of the respective knives.

Figs. 4 and 5 are sectional views along lines IV—IV and V—V respectively in Fig. 1.

The various parts of the machine are carried by a frame-work 1, provided with guides 2, 3 for a horizontally movable slide 4, and with guides 5, 6 for two vertically movable slides 7, 8. These guides are so designed that the slide 4 and the slide 7, 8 respectively, can move alternately past an opening in the frame-work, through which a wooden block 9, 10 respectively, is being advanced perpendicularly to the plane of the drawing. By means of some suitable feed mechanism which may be of known construction, the blocks are being automatically advanced by steps equal to the desired thickness of a splint, the blocks having the grain running in the vertical direction and being each guided by a pair of guide-jaws 11, 12 which may be provided with guide-knives extending in the feed direction for engagement with the wood, and the upper one of which, denoted by 11, is suitably being pressed downward by compression springs not shown, mounted in the frame-work.

Preferably, the three slides receive their motion by being each operatively connected with one arm on a rocking drive shaft. In the embodiment shown a centrally arranged shaft 13 is thus provided with a three-armed T-shaped lever 14, 15, 16, one arm 14 of which has a sliding-piece 17 engaged by a transversal guide 18 on the slide 4 and the other two, oppositely directed arms 15, 16 of which are each by means of a link 19 connected with the vertically movable slides 7 and 8 respectively. The machine may advantageously be made substantially symmetrical in respect of the vertical plane through the shaft 13. A rocking motion is imparted to the latter, suitably by arranging that an arm 20 rigidly secured thereto is, by means of a connecting rod 21, connected to a crank disc 22 or the like on a main driving shaft 23 of the machine, operatively connected to which is also the above-mentioned feed mechanism for the wooden blocks.

At the top each slide 7, 8 is formed into a shelf upon which is mounted a knife holder 24 wherein, in the embodiment shown, two rows of longitudinally scoring knives 25, 26 are clamped. The distance between the knife-edges in each row is twice the width of a splint, and the two rows are mutually displaced a distance corresponding to the width of one splint. By this arrangement, shown in Fig. 2, it is attained that the wood, when being scored longitudinally, is subjected to a reduced compression between the knives whereby the wood will more easily withstand the subsequent cross-scoring without being injured. In the arrangement shown in Fig. 2 the knives are preferably arranged to act during the downward return movement of the slide.

The horizontally movable slide 4 is at each end provided with a number of, in this case three, scoring knives 28 and with a severing knife 29 extending along the entire height of the wooden blocks 9, 10 and having its cutting edge preferably at right angles to the movement direction of the slide. The knives 28 are mounted in a separate holder 27 screwed to the slide, and are situated at a distance from one another corresponding to the length of the match splints, their object being to cut the splints into proper lengths before they are being detached from the wooden block by means of the knife 29 following closely behind the cross-cutters 28.

Assuming the shaft 23 to rotate in the clockwise direction, the slides 4 and 8 are moving to the right and downwards, respectively, from the positions shown in Fig. 1. The knives 25, 26 carried by the slide 8 have just been moved across the front surface of the wooden block 10. During this downward movement of these knives, some of which only are shown in Fig. 3, said knives have scored the block lengthwise of the grain, the mutual distance between the scores a being equal to the width of the splints. Moving to the right across the block, the knives 28 at the right end of slide 4 now score the block crosswise of the grain, the scores being indicated by b in Fig. 3. The splints partially formed by the scores a and b are detached from the block by means of knife 29 following closely behind the cross-cutters 28 and operating in a plane parallel to the front surface of the block, said plane being indicated by lines c, d in Fig. 3. The slide 4 is thereupon moved to the left, in a similar manner operating upon the block 9 with the knives 28, 29 at its left end. Simultaneously the slide 8 is raised to its topmost position. When its knives 25, 26 are at a higher level than the block 10, the latter is advanced a step equal to the thickness of the splints, whereupon the described sequence of operations is repeated.

What I claim is:

1. A splint cutting machine, comprising in combination, a supporting frame-work having means for holding a wooden block in a definite position with respect to its grain direction, a slide mounted for reciprocation in said direction, a set of length-scoring knives carried by said slide, a second slide movable perpendicularly to the path of said first slide, a set of cross-scoring knives carried by said second slide, a splint severing knife also carried by said second slide, and extending in a plane parallel to the path thereof.

2. A splint cutting machine, comprising in combination a supporting frame-work having means to accommodate two non-rotating wooden blocks in separate working positions, a slide mounted on said frame-work for reciprocation alternately past said working positions, a set of cross-scoring knives and a splint detaching knife mounted on said slide at each end thereof, a set of length-scoring tools for each of said working positions, and a movable support for each of said tool sets, said supports being movable past the working positions in timed relation to the movement of said slide, and perpendicularly to the path thereof.

3. A splint cutting machine, comprising in combination, a supporting frame-work having two separate working positions, each for a non-rotatable wooden block, a first slide mounted on said frame-work for reciprocation alternately past said working positions, a set of cross-scoring knives and a splint detaching knife mounted on said slide at each end thereof, two other slides mounted for reciprocation, each past one of said working positions, perpendicularly to the path of said first slide and in timed relation to the movement thereof, and a set of length-scoring knives mounted on each of said other slides.

4. A machine according to claim 4, and having a rocking drive shaft and three arms thereon, each operatively connected to one of said three slides.

5. A splint cutting machine, comprising in combination, a supporting frame-work having a working position for a non-rotatable wooden block, a slide mounted on said frame-work for reciprocation past said working position, a set of cross-scoring knives and a splint detaching knife mounted on said slide, a set of length-scoring tools, and a movable support for said tools, said support being movable past the working position perpendicularly to the path of said slide and in timed relation to the movement thereof.

6. A splint cutting machine, comprising in combination, a supporting frame-work having a working position for a non-rotatable wooden block, a first slide mounted on said frame-work for reciprocation past said working position, a set of cross-scoring knives and a splint detaching knife mounted on said slide, a second slide mounted for reciprocation past said working position perpendicularly to the path of said first slide and in timed relation to the movement thereof, and a set of length-scoring knives mounted on said second slide in a plurality of succeeding and laterally displaced rows.

PAUL WILHELM DIETMANN.

REFERENCES CITED

The following references are of record in the file of this patent:

UNITED STATES PATENTS

| Number | Name | Date |
|---|---|---|
| 272,113 | Beer | Feb. 13, 1883 |
| 295,173 | Hill | Mar. 18, 1884 |
| 2,137,597 | Uline | Nov. 22, 1938 |
| 2,355,512 | Contratto | Aug. 8, 1944 |